Oct. 18, 1932.

F. R. JONES

GARBAGE AND REFUSE INCINERATOR

Original Filed Dec. 8, 1925

Re. 18,622

Frederick R. Jones, Inventor.
By Emil Neubart,
Attorney.

Witness:
J. J. Oberst.

Reissued Oct. 18, 1932

Re. 18,622

UNITED STATES PATENT OFFICE

FREDERICK R. JONES, OF CHICAGO, ILLINOIS

GARBAGE AND REFUSE INCINERATOR

Original No. 1,692,448, dated November 20, 1928, Serial No. 74,153, filed December 8, 1925. Application for reissue filed October 10, 1930. Serial No. 487,881.

My invention relates to improvements in garbage and refuse incinerators of the type adapted especially for use in apartment buildings, residences, hospitals, and the like; and it has for one of its objects to provide a simple and inexpensive incinerator wherein garbage or refuse can be consumed conveniently, economically, and in a cleanly and sanitary manner, and which, by means of a smoke pipe or flue, is connected to a chimney of the building in which the incinerator is situated.

Another object of my invention is to provide a gas-burning down-draft incinerator, and particularly one in which the air mixes directly with the gas above the garbage or refuse being consumed.

A further object of my invention is to provide an incinerator in which the gas burner is located in a plane above the charging or feed opening, and wherein the major portion, at least, of the garbage or refuse to be consumed occupies the space between said opening and the grate.

A further object of my invention is the provision of an incinerator wherein the gas burner attacks the garbage or refuse from the top, and the flame of the burner burns from the top downwardly so that it attacks, at all times, the portion of the garbage or refuse having least moisture, and by reason of the draft being downwardly through the garbage or refuse, gradually dries the garbage or refuse from the top downwardly, with the result that practically all of the garbage or refuse will be consumed and only a comparatively small quantity of ash or waste result from the operation of incinerating the garbage or refuse.

A still further object of my invention is to provide an incinerator having a gas burner so disposed therein that the direction of the flame and draft is downwardly through the garbage or refuse and wherein the draft pipe or flue has its inlet opening in a plane below the lowest portion of the garbage or refuse receptacle or container.

A still further object of my invention is to provide an incinerating chamber having imperforate walls and a grate-like or open-work receptacle or container having a perforated bottom and at least a rear imperforate wall of the incinerating chamber to form an auxiliary flue, and a draft pipe or flue having an inlet connected with the lower end of said auxiliary flue.

With the above and other objects in view to appear hereinafter, my invention consists in the novel features of construction and in the arrangement and combination of parts to be hereinafter described and more particularly pointed out in the subjoined claims.

Figure 1:
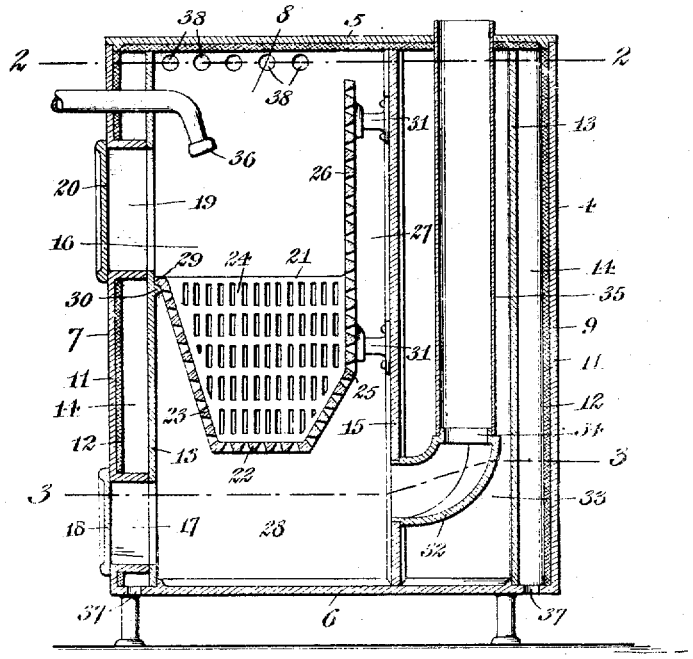
Fig. 1 is a central vertical section through an incinerator constructed in accordance with my invention.
Figure 2:
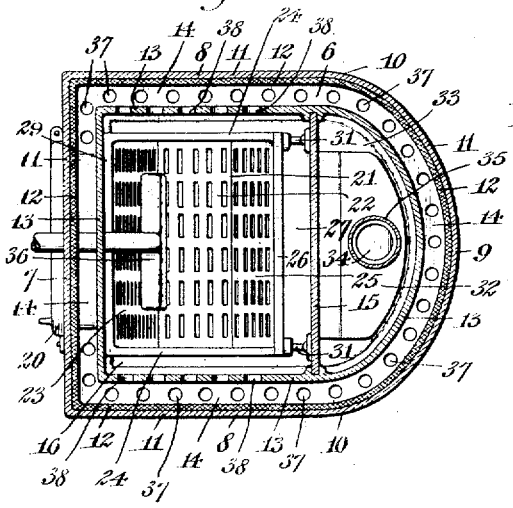
Fig. 2 is a horizontal section taken on line 2—2, Fig. 1.
Figure 3:
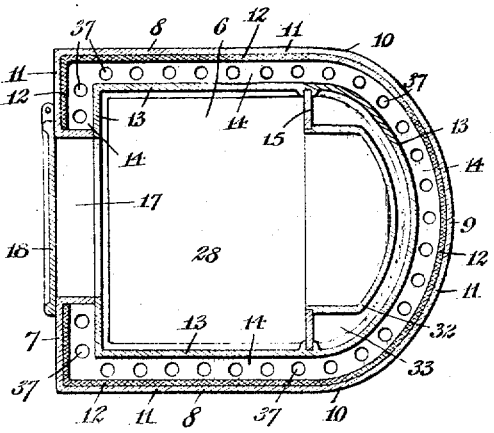
Fig. 3 is a horizontal section taken on line 3—3, Fig. 1.

The reference numeral 4 designates the casing of the incinerator, which comprises a top wall 5, a bottom wall 6, a front wall 7, opposite side walls 8, and a rear wall 9, the latter being curved and merging into the side walls 8, as at 10. The front, side, and rear walls constitute a surrounding wall and each comprises an outer wall portion 11 lined with asbestos 12 in sheathing or other suitable form for insulation purposes, and an inner wall portion 13 spaced from said outer wall portion to form an intervening air space or passage 14, said air space or passage extending from the bottom wall 6 to the top wall 5.

Within this incinerator casing a transverse wall, or what may be termed a back plate, 15 is arranged, which extends from side wall to side wall and between which and the front wall 7, the incinerating chamber 16 is arranged.

At the bottom of the front wall 7 a door opening 17 is provided, which is closed by a door 18. Near the upper end of said front wall, a charging or feed opening 19 is formed which is also closed by a door 20.

Arranged within the incinerating chamber 16 is a basket-like garbage or refuse receptacle or container 21 formed of open-work or grate-like walls. This receptacle or container comprises a bottom wall or grate 22, a front wall 23, side walls 24, and a rear wall 25, the front wall being inclined downwardly and rearwardly from its upper end, as clearly shown in Fig. 1, while the rear wall has its lower portion inclined downwardly and forwardly approximately from a point midway between the upper and lower ends of said receptacle or container to said grate 22; thus gradually reducing the cross-sectional area of the receptacle downwardly. While this formation is desirable, owing to the fact that the front wall and the lower portion of the rear wall are thus spaced gradually increasing distances from the front wall 7 of the casing and the back plate 15, respectively, it is to be understood that this garbage or refuse receptacle or container may be otherwise constructed. Although the grate 22 is shown as non-shakable, or non-movable, it is of course to be understood that it is within the province of those skilled in the art to which this invention relates, when constructing the incinerator, to provide shaking, rocking or other movable bars; or, if desired, an integral grate movable or rockable in any desired manner.

It is to be noted that the rear wall 25 of the garbage or refuse receptacle or container is extended upwardly a considerable distance above the upper edge of the side walls of said receptacle or container, as shown at 26. The rear wall of the garbage or refuse receptacle or container is spaced from the rear wall or back plate 15 of the incinerating chamber, and this space serves as an auxiliary flue 27, which extends from the upper end of said rear wall downwardly into the ash pit 28 beneath the receptacle or container 21.

The receptacle or container 21 may be supported in any practicable manner, but in the construction illustrated, the front wall 23 thereof has a forwardly extending flange 29, which rests upon a supporting rib 30 formed on the front inner wall 13 of the incinerator casing, while brackets or supports 31 fastened to the rear wall or back plate 15 of the incinerating chamber are secured to the rear wall of said receptacle or container and support the same from the rear.

The side walls 24 of the receptacle or container 21 are spaced from the side walls 8 of the incinerator casing so that the open-work walls of said receptacle or container are spaced at all points from the surrounding walls of the incinerating chamber.

The rear wall or back plate 15 of the incinerating chamber has a laterally elongated opening formed therein near its lower end, and fitted into this opening is the correspondingly elongated end of a smoke or draft box 32, the inlet opening of which is therefore of considerable area. This draft box is situated in the flue chamber 33 between the rear wall or back plate 15 of the incinerating chamber and the curved rear wall 9 of the incinerator casing. This smoke or draft box is provided at the top with an outlet opening 34, and connected to this opening is a smoke or draft pipe 35 which extends upwardly through the flue chamber 33 and out through the top 5 of the incinerator casing. To the upper end of this smoke or draft pipe 35 is adapted to be secured a suitable pipe or flue leading to a chimney of the building in which the incinerator is situated, so that connection is had directly with the incinerating chamber 16 to establish a means of escape for the unconsumed gases or smoke.

36 designates a gas burner, which may be of any approved construction, and which is situated in the upper end of the incinerating chamber 16 a suitable distance above the garbage or refuse placed within the receptacle or container 21. This gas burner extends out through the front wall 7 of the incinerator casing and is adapted to have connection with any suitable source of gas supply and provided with suitable means of control, as will be understood to those skilled in the art.

The gas burner 36 is directed downwardly so that the flame issuing therefrom will be directed against the top of the garbage or refuse contained in the garbage or refuse receptacle or container 21.

It is the general practice in garbage or refuse incinerators of this type to fill the garbage or refuse receptacle or container with the garbage or refuse and allow the same to dry, if moisture laden, before incineration takes place. Consequently, the upper portion of the garbage or refuse will dry out before the lower portion, and when burned from the bottom, or from the sides, the wet portions first are attacked, causing excessive smoke and imperfect combustion, unless the garbage or refuse accumulated is allowed to remain in the receptacle or container for an impracticable length of time, in order to assure complete drying of the same from top to bottom. In this improved incinerator, when the upper portion of the garbage or refuse is freed of moisture, at least to a degree found desirable before commencing incineration thereof, the burner 36 is ignited. The flame directed against the top of the garbage or refuse will attack and gradually consume the same, and as the walls of the refuse receptacle are all provided with openings and the inlet to the smoke or draft box 32 is in a plane beneath said receptacle, it will be clear that the direction of the draft and the effective action of the flame will be in a downward course, thus drying out the lower portion of the garbage while consuming the upper. Before the upper portion is fully consumed, the lower portion will be sufficiently dry to enable the flame to consume the same. All the garbage will therefore be consumed in a shorter period of time than heretofore possible, or will at least be reduced to ashes. This results in a saving of gas, eliminates smoke and odors and assures clean surroundings.

By reason of having the rear wall 25 of the receptacle or container 21 extended upwardly, the flame from the burner will also be directed rearwardly through the upwardly extended portion of said rear wall and thence downwardly, with the result that the garbage within the receptacle or container will also be attacked from the rear, and as the draft in the auxiliary flue 27 in rear of said rear wall is downwardly, the smoke and gases will pass downwardly through said flue, also from the sides of the receptacle or container, and escape through the inlet of the smoke or draft box 32, from which it will pass upwardly through the smoke or draft pipe 35 and be drawn into the chimney.

It is highly essential that the proper quantity of air be provided to the incinerating chamber, especially to the flame of the gas burner, and for this purpose the bottom wall 6 of the incinerator casing is provided with numerous air openings 37, said openings being alined with the air space or passage 14 between the outer and inner wall portions of the casing. The air entering these openings travels upwardly through said space or passage and enters air openings 38 formed in the inner wall portion of the casing at opposite sides of the incinerating chamber, preferably at their extreme upper ends. The air thus entering the incinerating casing commingles freely with the gas escaping from the burner 36 and furnishes the proper amount of oxygen necessary to provide a hot flame and to furnish the garbage or refuse where attacked by the flame, with the necessary quantity of air to assure proper combustion.

Having thus described my invention, what I claim is:

1. A garbage and refuse incinerator comprising an incinerating chamber provided with a refuse receptacle having grate-like walls and a grate for supporting garbage or refuse, a gas burner situated to cause the flame thereof to attack garbage or refuse in said receptacle from the top, and means to cause a down draft through the garbage or refuse until fully consumed when attacked by the flame from said gas burner.

2. A garbage and refuse incinerator, comprising an incinerating chamber having a charging opening for garbage or refuse, a refuse container for the garbage or refuse including a grate at the bottom thereof, a burner situated in said incinerating chamber above said charging opening, and means to cause a down draft through said refuse container and the grate thereof.

3. A garbage and refuse incinerator, comprising an incinerating chamber having a charging opening for garbage or refuse in one of its walls, a garbage or refuse receptacle provided with a grate at the bottom and a perforated rear wall spaced from the rear wall of said incinerating chamber to form a flue, a gas burner in said incinerating chamber above said refuse receptacle, air inlets in at least one of the walls of said incinerating chamber in a plane above said gas burner, and an opening for the escape of the products of combustion in the rear wall of said incinerating chamber directly beneath said flue.

4. A garbage and refuse incinerator, comprising a casing having a bottom, a top, and an inner and outer surrounding wall separated by an intervening air space, air inlets in said bottom opening into the lower end of said intervening air space, a transverse wall extending from said bottom to said top and from corresponding portions of said inner surrounding wall and separated from the remaining portion of said inner surrounding wall to form an incinerating chamber at one side thereof and a flue chamber at the other side thereof, a garbage or refuse receptacle within said incinerating chamber spaced from said bottom and also from said top, a charging opening in said surrounding walls for placing garbage or refuse within said receptacle, air inlet openings in said inner surrounding wall connecting said intervening air space with said incinerating chamber, and a gas burner situated between said inlet openings and said charging opening.

5. A garbage and refuse receptacle, comprising a casing, a transverse wall within said casing dividing the same into an incinerating chamber and a second chamber, a garbage or refuse receptacle within said incinerating chamber having a rear wall spaced from said transverse wall to form a flue, a draft box in said second chamber opening into said incinerating chamber beneath said garbage receptacle and in communication with the lower end of said flue, a draft pipe connected to said draft box and extending upwardly therefrom through said second chamber and out through said incinerator casing, a charging opening in one wall of said incinerator casing above said garbage or refuse receptacle, a gas burner between said charging opening and the top of said incinerating chamber, and air openings in at least one of the walls of said incinerating chamber near its upper end.

6. A garbage and refuse incinerator, comprising a casing having an incinerating chamber, a garbage or refuse receptacle having front, side, and rear walls spaced from the surrounding walls of said incinerating chamber and having a grate at the bottom and its rear wall extended upwardly to a point near the upper end of said incinerating chamber, the walls of said receptacle being provided with openings, a charging opening in the front wall of said incinerating chamber above said garbage or refuse receptacle, a draft flue between the rear wall of said garbage or refuse receptacle and the rear wall of said incinerating chamber, a draft opening in said rear wall at the lower end of said flue, a gas burner within said incinerating chamber above said charging opening and positioned to direct the flame therefrom towards said refuse receptacle and against the rear wall thereof, and an air inlet opening into said incinerating chamber at its upper end.

7. A garbage and refuse incinerator, comprising a casing having a double surrounding wall providing an air space therein, a bottom wall provided with air inlets opening into said air space, a top wall closing the upper end of said air space, and a transverse wall forming an incinerating chamber and a flue chamber within said casing, both chambers extending from top to bottom of said casing, an opening in one of the walls of said casing near its lower end, a charging opening in said wall above said first-mentioned opening, an open-work receptacle within said incinerating chamber between said first-mentioned opening and said charging opening, said open-work receptacle having one of its walls extended upwardly parallel with said transverse wall and spaced therefrom, air inlet openings connecting the upper end of said air space with the upper end of said incinerating chamber, a gas burner situated in said incinerating chamber between said air inlet openings and said charging opening, a draft box in said flue chamber opening through said transverse wall at the lower end to said flue, and a draft pipe connected to said draft box and extending upwardly therefrom through the top of said incinerator casing.

8. A garbage or refuse incinerator, comprising a casing having an incinerating chamber, a draft flue leading upwardly from the lower end of said incinerating chamber and having its inlet in the rear wall of said chamber, a refuse receptacle within said chamber having a grate and an open-work rear wall spaced from the rear wall of said incinerating chamber to form an auxiliary flue connected at its lower end with said draft flue, and a burner above said refuse receptacle to attack the refuse in said receptacle from the top.

9. A garbage or refuse incinerator, comprising a casing having an incinerating chamber, a draft flue extending upwardly in rear of said chamber and having connection with the lower end thereof, a refuse receptacle spaced from the walls of said chamber and having a grate and draft openings in its front, side and rear walls, said rear wall being extended upwardly from the upper end of said receptacle and being spaced throughout its length from the rear wall of said incinerating chamber to form an auxiliary flue having connection at its lower end with the lower end of said draft flue, the walls of said incinerating chamber having air openings leading to the upper end thereof, and a burner above said refuse receptacle and in front of the upwardly-extended portion of the rear wall thereof to attack the refuse in said receptacle from the top and to cause part of the flame thereof to be drawn through said upwardly-extended portion of the rear wall and downwardly through said auxiliary flue so as to attack the refuse through the rear wall of said receptacle.

10. A garbage and refuse incinerator, comprising an incinerating chamber having a charging opening for garbage or refuse in one of its walls, a garbage or refuse receptacle provided with a grate at the bottom and a perforated rear wall spaced from the rear wall of said incinerating chamber to form a down-draft flue, air inlets in at least one of the walls of said incinerating chamber for the admission of air to the upper end of said garbage receptacle, and an opening for the escape of the products of combustion in the rear wall of said incinerating chamber in a plane beneath said garbage or refuse receptacle.

11. A garbage or refuse incinerator, comprising a casing having a bottom, a top, and an inner and outer surrounding wall separated by an intervening air space, air inlets opening from the exterior to the lower end of said intervening air space, air inlets at the top of said inner surrounding wall connecting the upper end of said intervening air space with the space surrounded by said inner surrounding wall, a transverse wall extending from said bottom to said top and from corresponding portions at opposite sides of said inner surrounding wall to form an incinerating chamber at one side thereof and an up-draft flue at the other side thereof, said transverse wall having an opening at a low point connecting said incinerating chamber with said flue, a charging opening at a high point of said incinerating chamber, means to close said charging opening, an opening at a low point of said incinerating chamber for removing ashes or other residue therefrom, and a closure for said last-mentioned opening.

12. A garbage and refuse incinerator, comprising an incinerating chamber provided with a refuse receptacle having an open-work wall to support a quantity of garbage or refuse, a burner situated above said open-work wall and directing its flame onto the garbage or refuse, and an outlet for the products of combustion beneath the lowest point of said refuse receptacle to cause suction downwardly through all parts of said receptacle.

13. A garbage and refuse incinerator, comprising an incinerating chamber provided with a refuse receptacle having grate-like walls and a grate to support garbage or refuse, a burner situated to attack garbage or refuse in said receptacle, and means to cause a down-draft through the garbage or refuse until fully consumed by action of said burner.

14. A garbage or refuse incinerator, comprising an incinerating chamber, an open-work garbage or refuse support within said chamber, a burner within said chamber above said garbage or refuse support to attack the garbage or refuse on said support from a plane above the latter, and means to cause a down-draft within said incinerating chamber through the garbage or refuse on said support.

15. A garbage and refuse incinerator, comprising an incinerating chamber, a garbage or refuse support within said chamber on which the garbage or refuse is placed, a gas burner within said chamber above said garbage or refuse support so that the flame from said burner will attack the garbage or refuse on said support from a plane above the latter, means to cause a down-draft within said incinerating chamber through the garbage or refuse on said support, and means to introduce air to said incinerating chamber so as to commingle with the burning gas from said burner.

16. A garbage and refuse incinerator having an incinerating chamber provided with a grate-like garbage support and a foraminous side wall projecting upwardly therefrom to a point adjacent the top of said chamber, and means to create a down draft through the garbage or refuse when ignited at the top to cause a downward consumption of garbage and refuse on said support, the draft being downwardly along and through the said foraminous side wall, through said inner chamber, and through said grate.

17. A garbage or refuse incinerator having an incinerating chamber provided with a refuse support and a foraminous rear wall projecting upwardly therefrom to a point adjacent the top of said chamber, said incinerating chamber having an opening for introducing garbage or refuse thereinto, a closure for said opening, an opening in said incinerator for removing the ashes or other residue therefrom, and means for causing a down draft through the accumulated garbage in said incinerating chamber and outwardly and downwardly through said foraminous wall.

In testimony whereof, I affix my signature.

FREDERICK R. JONES.